United States Patent
Santhanam et al.

(10) Patent No.: US 8,923,895 B2
(45) Date of Patent: Dec. 30, 2014

(54) OPTIMAL SLEEP / PAGING CYCLE DURATION IN A WIRELESS NETWORK

(75) Inventors: Arvind S. Santhanam, San Diego, CA (US); Arulmozhi K. Ananthanarayanan, San Diego, CA (US); Eric C. Rosen, Solana Beach, CA (US); Bongyong Song, San Diego, CA (US); Mark A. Lindner, Superior, CO (US); David J. Ross, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 522 days.

(21) Appl. No.: 12/377,116

(22) PCT Filed: Sep. 28, 2007

(86) PCT No.: PCT/US2007/080002
§ 371 (c)(1),
(2), (4) Date: Feb. 10, 2009

(87) PCT Pub. No.: WO2008/040025
PCT Pub. Date: Apr. 3, 2008

(65) Prior Publication Data
US 2010/0159959 A1    Jun. 24, 2010

Related U.S. Application Data

(60) Provisional application No. 60/827,424, filed on Sep. 28, 2006.

(51) Int. Cl.
*H04W 24/00*   (2009.01)
*H04W 52/02*   (2009.01)
*H04W 68/02*   (2009.01)

(52) U.S. Cl.
CPC .............. *H04W 52/02* (2013.01); *H04W 68/02* (2013.01)
USPC ........ 455/458; 455/426.1; 455/420; 455/421; 455/574; 370/311; 370/318; 370/338

(58) Field of Classification Search
CPC .............................. H04W 52/02; H04W 68/02
USPC ........... 455/458, 550.1, 574, 420, 421, 426.1; 370/311, 318, 338
See application file for complete search history.

(56) References Cited

U.S. PATENT DOCUMENTS 5,826,173 A * 10/1998 Dent ........................... 340/7.38
6,138,032 A    10/2000 Hill et al.
(Continued)

FOREIGN PATENT DOCUMENTS

EP    0627836    12/1994
EP    0711089    5/1996
(Continued)

OTHER PUBLICATIONS

International Preliminary Report on Patentability, PCT/US2007/080002, International Bureau of WIPO, Apr. 9, 2009.
(Continued)

*Primary Examiner* — Babar Sarwar
(74) *Attorney, Agent, or Firm* — Raphael Freiwirth (57) ABSTRACT

Systems and methods for optimizing paging cycles in a wireless communication system are disclosed. An access terminal can include logic configured to determine an optimal paging cycle and logic configured to set the paging cycle based on the optimal paging cycle, where the paging cycle varies based on at least one optimizing metric.

45 Claims, 7 Drawing Sheets

(56) References Cited

U.S. PATENT DOCUMENTS

| | | |
|---|---|---|
| 6,560,453 B1 * | 5/2003 | Henry et al. ............... 455/67.11 |
| 2003/0185162 A1 | 10/2003 | Fraser et al. |
| 2004/0160942 A1 | 8/2004 | Kelley et al. |
| 2005/0186973 A1 * | 8/2005 | Gaal et al. .................... 455/458 |
| 2007/0238476 A1 * | 10/2007 | Sharma et al. ................ 455/515 |

FOREIGN PATENT DOCUMENTS

| | | |
|---|---|---|
| EP | 1193985 | 4/2002 |
| WO | 00/22837 | 4/2000 |
| WO | 01/60103 | 8/2001 |
| WO | 2005104588 | 11/2005 |
| WO | 2007040683 | 4/2007 |

OTHER PUBLICATIONS

International Search Report, PCT/US2007/080002, International Searching Authority, European Patent Office.

Written Opinion, PCT/US2007/080002, International Searching Authority, European Patent Office.

* cited by examiner

Fig. 3A 8.5.7.2.2 SlottedMode Attribute

| Field | Length (bits) | Default |
|---|---|---|
| Length | 8 | N/A |
| AttributeID | 8 | N/A |

One or more of the following attribute value record:

| ValueID | 8 | N/A |
|---|---|---|
| SlotCycle1 | 54 | 0x9 |
| SlotCycle2 | 54 | 0x9 |
| SlotCycle3 | 54 | 0x9 |
| WakeCount1 | 4 | 0x0 |
| WakeCount2 | 4 | 0x0 |
| Reserved | 14 | N/A |

Length — Length of the complex attribute in octets. The sender shall set this field to the length of the complex attribute excluding the Length field.

AttributeID — The sender shall set this field to 0x01.

ValueID — The sender shall set this field to an identifier assigned to this complex value.

SlotCycle1 — The sender shall set this field to SlotCycle1. The sender shall not set this field to more than 0x1c.

SlotCycle2 — The sender shall set this field to SlotCycle2. SlotCycle2 shall be greater than or equal to SlotCycle1. The sender shall not set this field to more than 0x1c.

SlotCycle3 — The sender shall set this field to SlotCycle3. SlotCycle3 shall be greater than or equal to SlotCycle2. The sender shall not set this field to more than 0x1c.

WakeCount1 — The sender shall set this field to WakeCount1.

WakeCount2 — The sender shall set this field to WakeCount2. WakeCount2 shall be greater or equal to than WakeCount1.

OPTIMAL SLEEP / PAGING CYCLE DURATION IN A WIRELESS NETWORK

The present application claims priority to PCT Patent Application No. PCT/US2007/080002 filed Sep. 28, 2007 which claims priority to provisional U.S. Application Ser. No. 60/827,424, entitled "OPTIMAL SLEEP CYCLE DURATION FOR HANDSETS IN A WIRELESS NETWORK," filed Sep. 28, 2006, and assigned to the assignee hereof and hereby expressly incorporated by reference herein.

BACKGROUND OF THE INVENTION

1. Field

The present invention generally relates to communications in a wireless environment. More particularly, the invention relates to optimizing paging/sleep cycles in a wireless communication system.

2. Background

Wireless communication systems developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems mobile devices (referred to as mobile stations, handsets, access terminals, and/or user terminals) receive signals from fixed position base stations (also referred to as cell sites or cells) that support communication links or service within particular geographic regions adjacent to or surrounding the base stations. In order to aid in providing coverage, each cell is often sub-divided into multiple sectors, each corresponding to a smaller service area or geographic region. An array or series of base stations placed adjacent to each other form a communication system capable of servicing a number of system users, over a larger region.

Typically, each mobile station monitors a control channel that can be used to exchange messages between the mobile station and the base station. The control channel is used to transmit system/overhead messages, whereas traffic channels are typically used for substantive communication (e.g., voice and data) to and from the mobile station. For example, the control channel can be used to establish traffic channels, control power levels, and the like, as is known in the art.

Additionally, since the mobile stations are typically battery operated, power conservation is emphasized in the system design. Accordingly, mobile stations can go into sleep cycles and periodically awaken to monitor the control channel for messages/paging directed to the mobile station. However, the responsiveness of the communication system can suffer because the sleep state imposes additional delay in establishing communications to the mobile station. The degradation of the system responsiveness increases as the duration of the sleep cycles increases. In systems with long sleep cycles, the system responsiveness may not be acceptable for all applications. Accordingly, system engineers may face a trade-off between poor power conservation and poor responsiveness.

SUMMARY

Exemplary embodiments of the present invention are directed to a system and method for optimizing paging/sleep cycles in a wireless communication system while maintaining some level of power conservation.

Accordingly an embodiment of the invention can include a method comprising: determining an optimal paging cycle; and setting a paging cycle of an access terminal based on the optimal paging cycle, wherein the optimal paging cycle varies over time based on at least one optimizing metric.

Another embodiment of the invention can include an apparatus comprising: logic configured to determine an optimal paging cycle; and logic configured to set a paging cycle on an access terminal based on the optimal paging cycle, wherein the optimal paging cycle varies over time based on at least one optimizing metric.

Another embodiment of the invention can include an access terminal comprising: means for determining an optimal paging cycle; and means for setting a paging cycle of the access terminal based on the optimal paging cycle, wherein the paging cycle varies over time based on at least one optimizing metric.

Another embodiment of the invention can include computer readable media embodying a method for optimizing paging cycles, the method comprising: determining an optimal paging cycle; and setting a paging cycle of an access terminal based on the optimal paging cycle, wherein the optimal paging cycle varies over time based on at least one optimizing metric.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation. In this description, the terms "mobile station," "handset," "access terminal (AT)," and "wireless device" are used interchangeably. The terms "sleep" and "start up" as used herein to mean the power management of shutting down all or partial power to the mobile station's modem, antenna, transmitter and/or receiver modules. An AT that is in the "sleep mode" does not monitor the Control Channel or any over-the-air messages that are transmitted in the network.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller and/or mobile switching center (MSC). Modem pool transceivers and modem pool controllers are parts of a network called an access network. An access network transports data packets between multiple access terminals. The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

Figure 1:
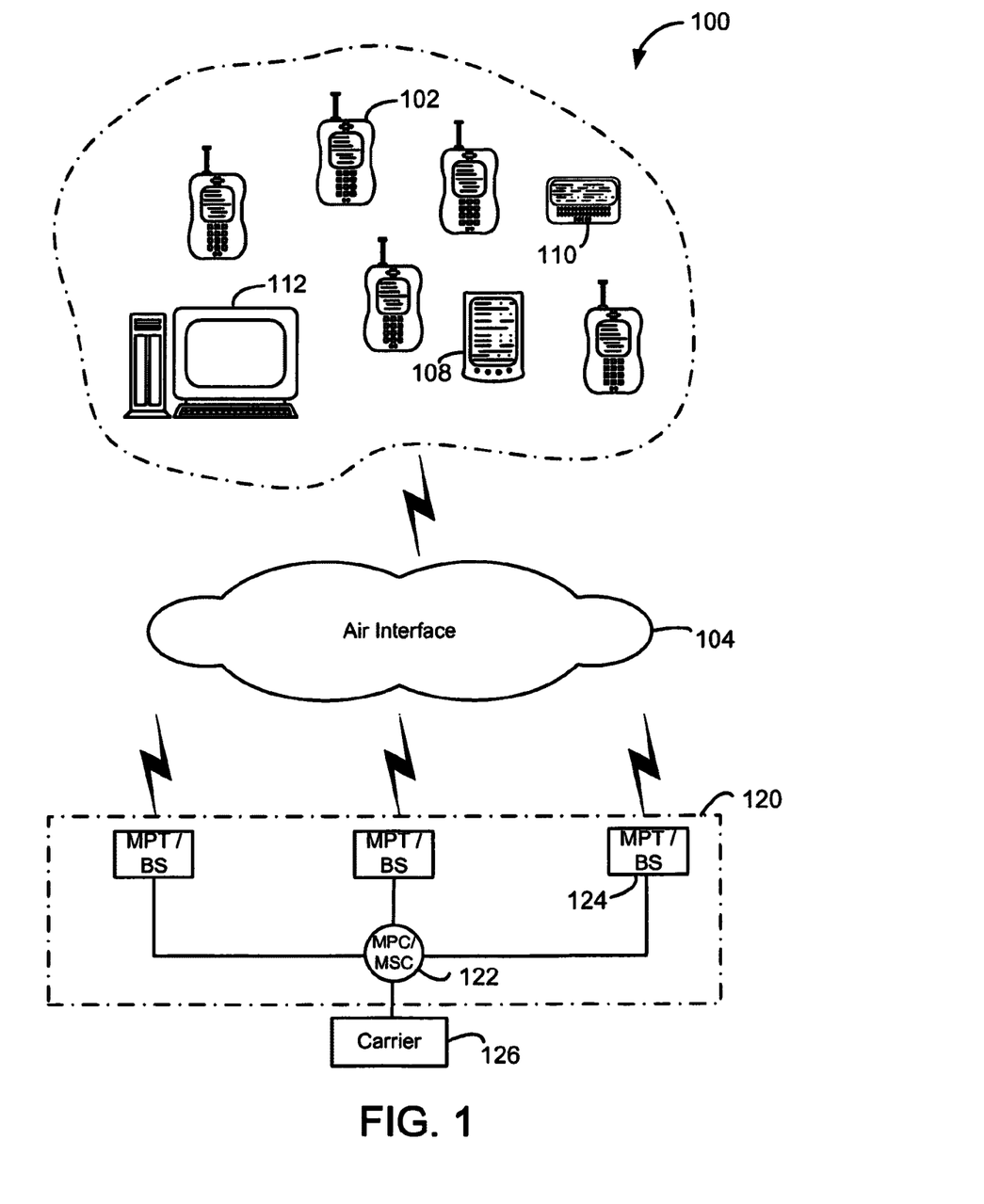
FIG. 1 is a diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, wireless network carrier 126, the Internet, and/or other remote servers.

The RAN 120 controls messages (typically sent as data packets) sent to a MPC/MSC 122. The carrier network 126 may communicate with the MPC/MSC 122 by a network, the Internet and/or a public switched telephone network (PSTN). Alternatively, the MPC/MSC 122 may connect directly to the Internet or external network. Typically, the network or Internet connection between the carrier network 126 and the MPC/MSC 122 transfers data, and the PSTN transfers voice information. The MPC/MSC 122 can be connected to multiple base stations (BS) or modem pool transceivers (MPT) 124. In a similar manner to the carrier network, the MPC/MSC 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, MPC/MSC 122 and other components may form the RAN 120, as is known in the art. However, alternate configurations may also be used and the invention is not limited to the configuration illustrated.

Figure 2:
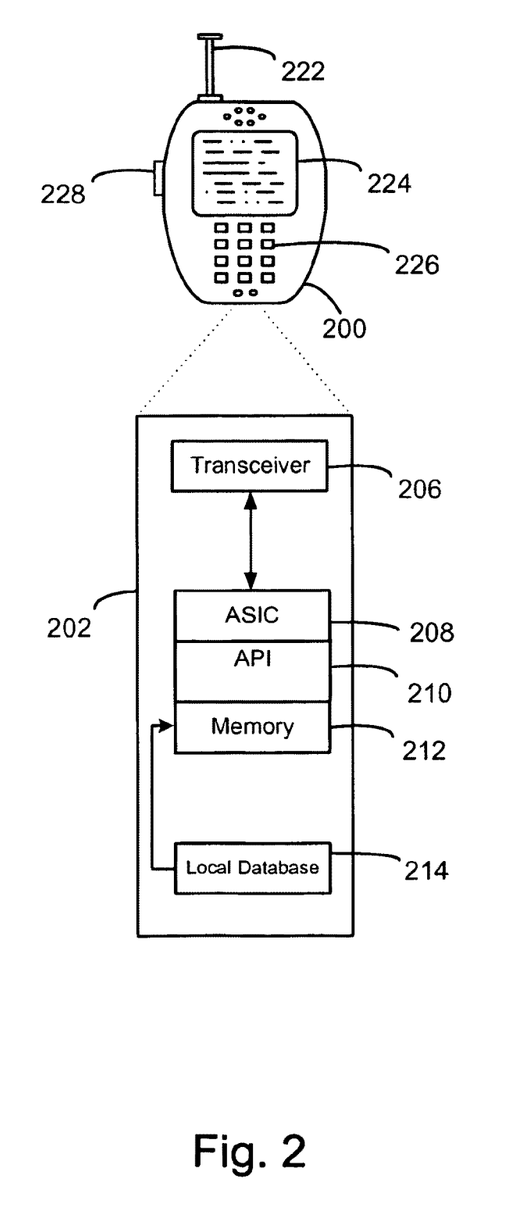
FIG. 2 is an illustration of an access terminal in accordance with at least one embodiment of the invention.

Referring to FIG. 2, the access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 2 are to be considered merely illustrative and the invention is not limited to the illustrated features or arrangement.

Accordingly an embodiment of the invention may include an access terminal comprising: logic configured to determine an optimal paging cycle and logic configured to set the paging cycle based on the optimal paging cycle, wherein the paging cycle varies over time based on at least one optimizing metric. As used herein, the term "optimal paging cycle" does not necessarily mean a minimum paging cycle available. For example, in some instances the determined optimal paging cycle may be an increased paging cycle based on one or more optimizing metrics (e.g., a low battery condition). Likewise, as used herein the term "optimizing metric" refers to any condition, value, data, and/or variable that can be used in the determination of the optimal paging cycle. Examples of determining the optimal paging cycle and optimizing metrics are discussed below. Further, as discussed above, the logic can be embodied in any combination of software and/or hardware configured to perform the described functions. For example, an application operating on access terminal 200 may include all the logic elements discussed above. Alternatively, an application may only contain selected logic elements that interact with one or more other resident applications and/or hardware elements (e.g., API layer 210, processor/ASIC 208, memory 212, and the like) containing the remaining logic to perform the functionality describe herein.

The wireless communication between the access terminal 102 and the RAN 120 can be based on different technologies, such as code division multiple access (CDMA), time division multiple access (TDMA), frequency division multiple access (FDMA), the Global System for Mobile Communications (GSM), or other protocols that may be used in a wireless communications network or a data communications network. The data communication is typically between the client device 102, MPT/BS 124, and MPC/MSC 122. The MPC/MSC 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

As discussed in the background, paging can be used to notify an access terminal (e.g., wireless device) that a communication directed to that terminal is available. Typically, the access terminal monitors a non-traffic channel (e.g., control channel) to check for paging directed to the access terminal. When an access terminal receives the paging information, a traffic channel can then be established between the access terminal and radio access network (RAN).

Since wireless devices are typically resource limited in terms of power, it is advantageous to set the wireless device into a low power or sleep mode, as is known in the art. However, entering a sleep mode will typically increase the delay for receiving paging information from the RAN, which can degrade the overall responsiveness of the wireless device and wireless communication. The following description is directed to a 1xEV-DO system to illustrate various aspects of embodiments of the invention. However, the invention is not to be construed as being limited to these embodiments.

Figure 3A:
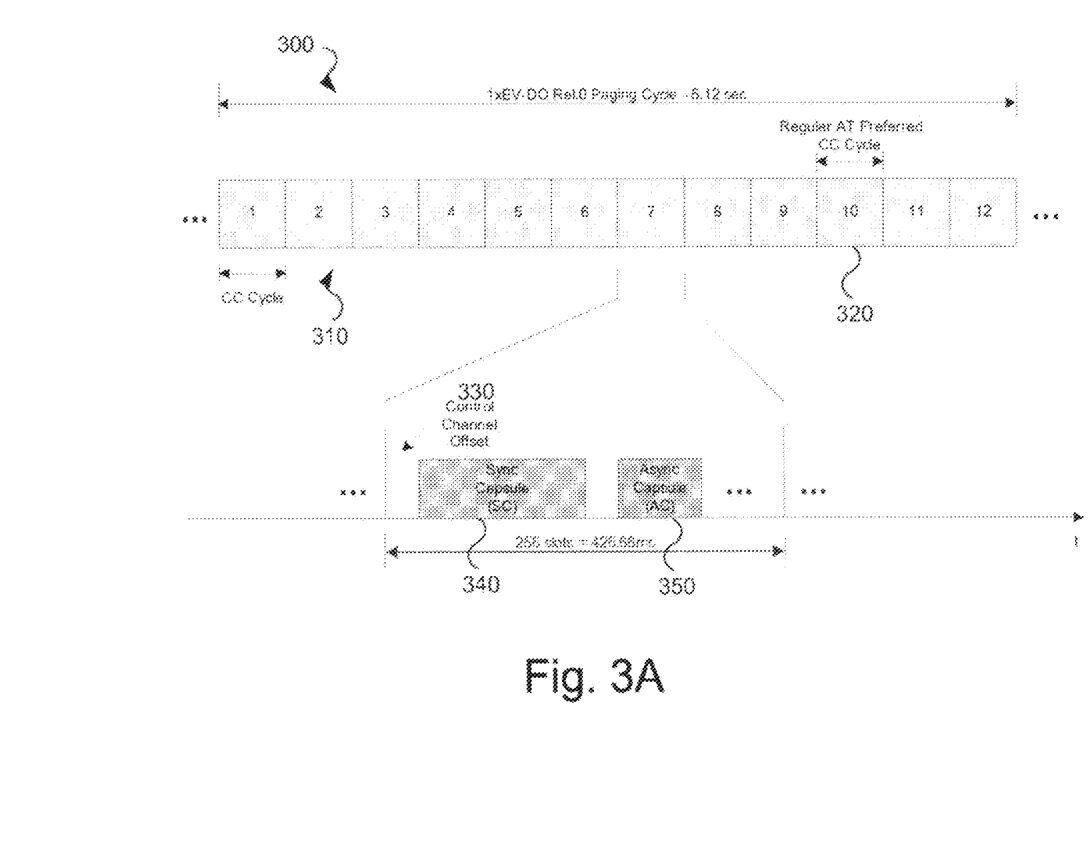
FIG. 3A is an illustration of a sleep cycle and details of the control channel in a 1xEV-DO system.

For example, as illustrated in FIG. 3A, wireless devices in standard 1xEV-DO operate with a 5.12 second paging cycle 300. The 5.12 second paging cycle 300 is comprised of twelve 426.66 ms Control Channel Cycles (CC Cycle) 310. During session configuration the RAN can map the wireless device to one (e.g., 320) of these 12 Control Channel Cycles so that it may page the mobile on a 5.12 second boundary. Further, in each CC Cycle, data including paging data can be communicated in both synchronous capsules (SC) 340 and asynchronous capsules (AC) 350. The SCs 340 occur in a predictable position in the CC Cycle, which is based on a defined control channel offset 330. In contrast the ACs 350 can occur at any time there is not a 340. While the standard 5.12 second paging cycle is adequate for many applications, it is far too long for delay sensitive applications.

Communication setup (e.g., a push-to-talk (PTT)/QChat call setup) is impacted directly and predominantly by the duration an access terminal (AT) sleeps. As discussed above, the AT wakes up periodically to read the Control Channel capsule to check for incoming calls as well as update overhead parameters (e.g., pilot set maintenance). In order to achieve sub-second call setup, the AT should wake up more frequently (e.g., every 213 milliseconds in 1xEV-DO release A). However, the amount of energy depleted when the AT wakes up every 213 ms can be significant and directly reduces the standby time of the AT. The AT typically remains awake for a number of slots every paging cycle in current implementations. The energy depletion is in proportion to the amount of time it stays awake. Significant improvements in battery life are possible if the call setup latency is slightly increased. Accordingly, optimizing the sleep/paging cycle can significantly impact both performance and standby time in the access terminal.

An application (e.g., QChat) can determine and configure the sleep duration for an AT to the maximum value possible based on a set of criteria that will impact the predicted performance of the application. For example, for a QChat/PTT application, one or more of the following inputs may be considered in setting the sleep duration/paging cycle:

Estimate of Rate of Call Arrival Rate in the next T units of time (e.g., minutes): This can be determined by each AT by determining the time or arrival of each incoming call. This information can be estimated by the QChat/PTT AT using a simple counter for each interval of time, for example.

Available Energy Reserve at the AT: This information can be made available to QChat/PTT Application via an internal API (e.g., iBattery in BREW).

These inputs can be used independently or prioritized for use in combination. For example, the call setup latency, e.g. subsecond QChat call setup could be prioritized over the call-failure rate due to battery drain. However, these could also be adjusted based on the system conditions. For example, if the battery of an AT drains quickly, it may not be able to receive calls until the battery is charged. In order to decrease the probability of failed calls due to battery-drain, it may be necessary to increase the sleep/standby time at the expense of call setup latency.

Accordingly, in at least one embodiment of the invention, the access terminal can adjust the time before it enters as sleep/standby mode. The access terminal can then wake up from the sleep mode to check the control channel for any overhead messages. Therefore, the wireless device can reduce its power consumption, while still being operative during the designated periods (e.g., every 213 ms) to monitor the control channel and reduce the latency. The latency is reduced because the wireless device will be paged within the shorter cycle (e.g., 213 ms), as opposed to the longer sleep mode paging cycle (e.g., 5.12 sec.). When data arrives at the RAN targeted for the wireless device, the RAN is aware of the shorter sleep cycle and schedules a page for the next control channel cycle as opposed to delaying for the 5.12 sec. cycle.

Figure 3B:
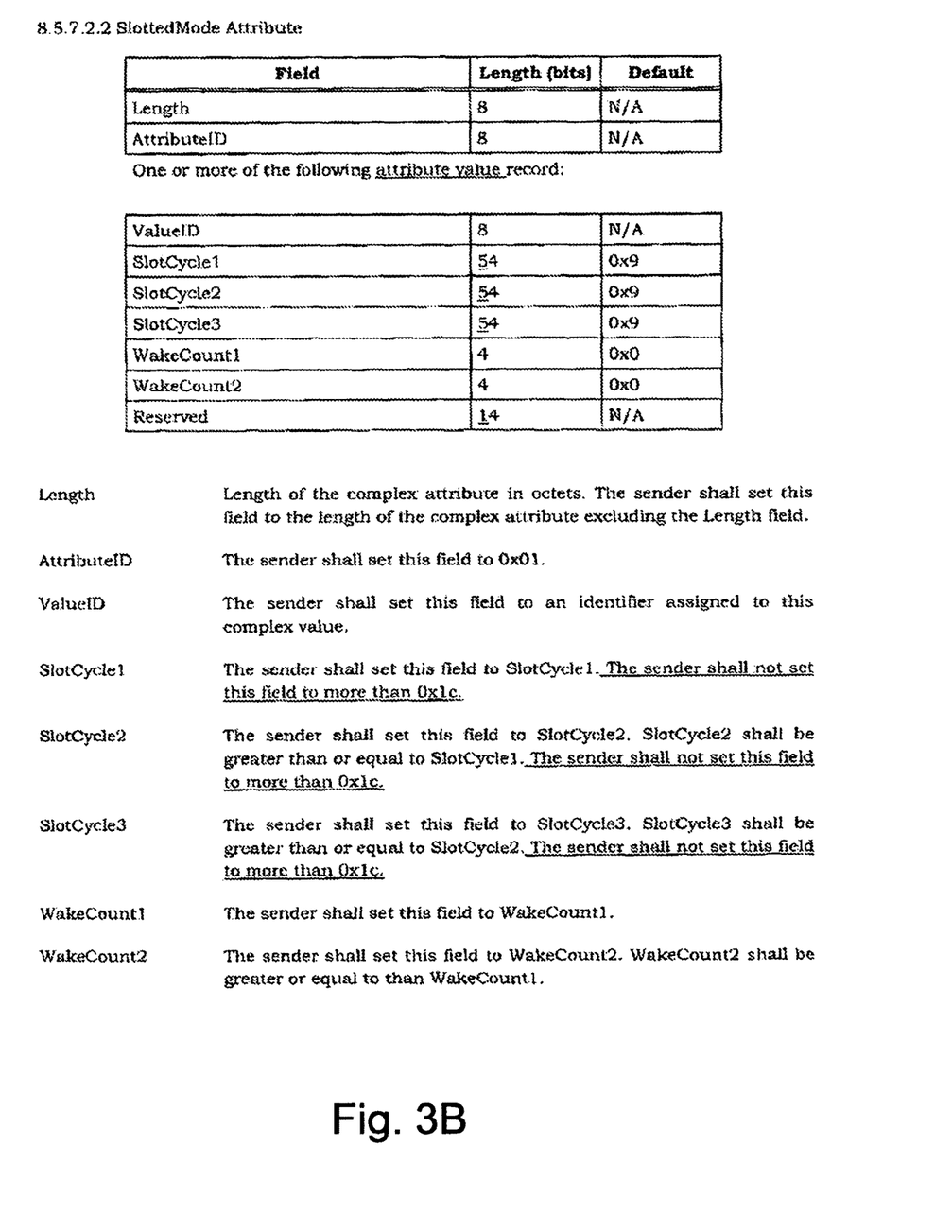
FIG. 3B is an illustration of the parameters of the Slotted-Mode attribute in a 1xEV-DO system.

For example, the QChat/PTT Application can configure the paging cycle by using a BREW extension or an API if one is available. This BREW extension/API can allow the QChat application to initiate configuration of the SlottedMode attribute associated with the 1xEV-DO Rev. A Enhanced Idle State protocol, for example. The parameters of the SlottedMode attribute are illustrated in FIG. 3B. The AT and the RAN can use the Generic Attribute Update Protocol (GAUP) to update this attribute. However, other equivalent means can be used in other wireless networks that permit the setting of paging cycles and embodiments of the invention are not limited to 1xEV-DO networks and QChat/PTT applications.

The standby time of an AT with a paging cycle set to 5.12 seconds is approximately 24 times higher than the standby time when operating at a 213 ms paging cycle. The current drain on conventional devices is about 28 mA when reading the Control Channel while it is about 0.9 mA when in the sleep mode. Accordingly, it will be appreciated that the gains in standby time are significant even for small increases to the call setup latency. Optimizing the use of the reduced sleep cycle mode/reduced paging cycle allows for improved responsiveness of the application and standby time. For example, if the call arrival rate for a QChat user shows similar characteristics every day, then the call arrival estimation algorithm can result in significant gains in standby time and still allow for reduced QChat call setup latency. Assume for instance that a user typically only receives QChat/PTT calls between 7 am-9 am and 2 pm-4 pm. Then, the call arrival estimation program in combination with the ability to adjust the sleep cycle can place the AT in the reduced sleep/paging cycle time during these periods of likely call activity. The remaining time can use a standard sleep/page cycle which will improve standby performance. By increasing the standby time of the AT, it is possible to increase the ultimate likelihood of the AT receiving a call. This can be achieved by associating a penalty function for call drops. This penalty function will help bias the sleep cycle of the AT to a higher value gracefully as the energy reserve of the AT decreases. Further, a Quality of Service framework can be determined based on the call setup latency for various customer profiles. For example, business and emergency groups may be given lower call setup latency guarantees while consumers may be provided increased standby time at the expense of call setup latency.

Figure 4:
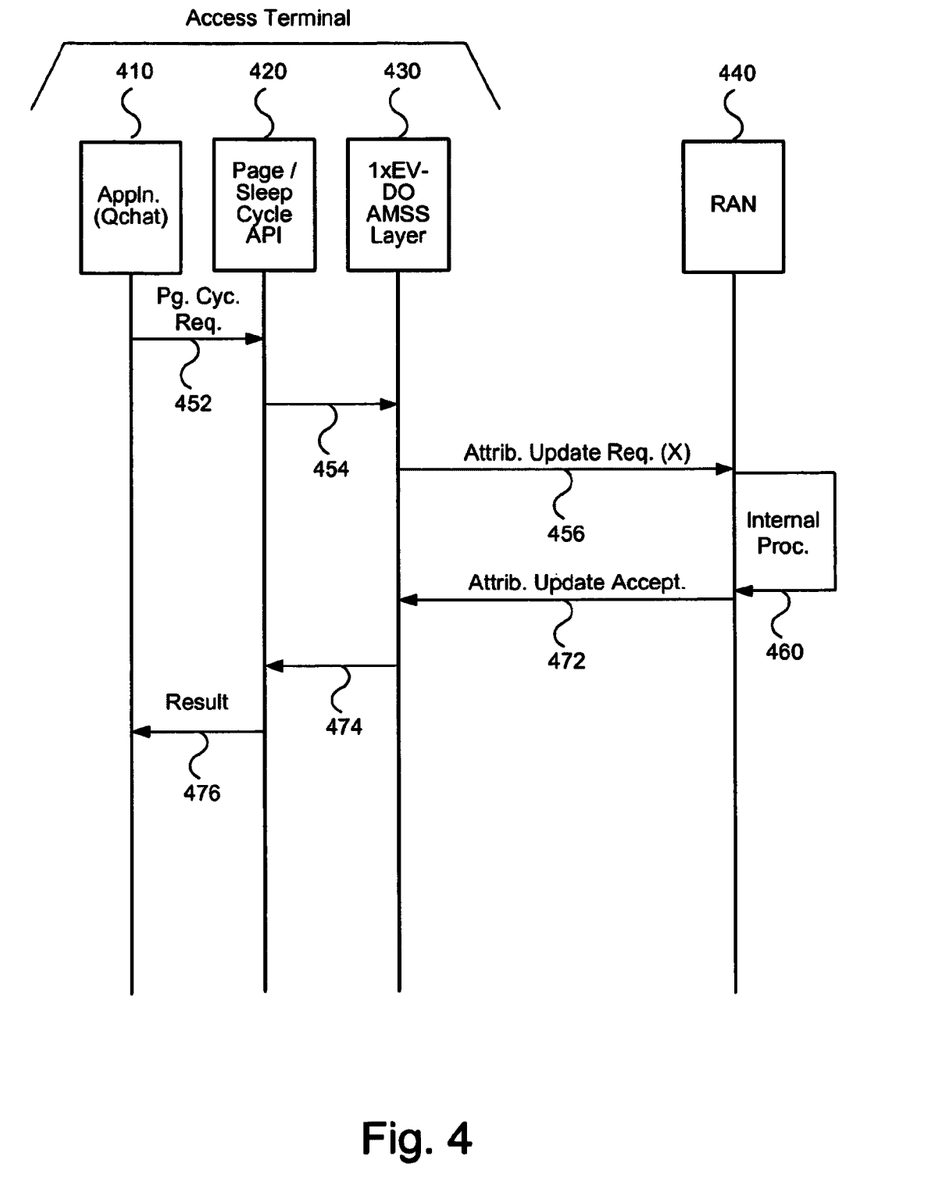
FIG. 4 is a signal flow diagram in accordance with at least one embodiment of the invention.

Referring to FIG. 4, a signal flow diagram in accordance with at least one embodiment of the invention is illustrated. For example an application (e.g. QChat) 410 can issue a request 452 for the API 420 to set a desired paging cycle. The API receives the request 452 and may perform additional processing on the request and then forwards the request 454 to the Advanced Mobile Station Systems (AMSS) layer 430. The AMSS layer sets the value of the attribute (e.g., "X") in accordance with the request. The attribute "X" is the Slotted-Mode attribute that includes parameters that control the paging cycle of the access terminal (see, e.g., FIG. 3B). The attribute "X" is then sent as part of an Attribute Update Request message 456 using the Generic Attribute Update Protocol (GAUP) to the RAN 440. The RAN 440 processes this value in accordance with the network protocols (e.g., 1xEV-DO standard) 460. If the RAN 440 accepts the proposed setting "X", an Attribute Update Accept message (or failure message if not accepted) is transmitted 472 to the access terminal. The AMSS layer 430 can receive and process this message and then passes it 474 to the requesting API 420. The API 420 then forwards the result 476 to the requesting application 410 as a confirmation of the new paging cycle (or failure).

As discussed in the foregoing, embodiments of the invention can be used to enhance the responsiveness of applications and still maintain acceptable battery performance. For example, one aspect of the invention is to maximize standby time given constraints on the delay in setting up QChat calls/PTT calls. One example of a constraint is to ensure that 95 percent of the mobile-terminated QChat calls are placed when the access terminal is operating at a 213 ms paging cycle. Other paging cycles of operation may include 426 ms, 1.28 sec, 2.56 sec, and 5.12 sec. To achieve a desired constraint, different algorithms may be used depending on the system conditions.

For example, one algorithm may be based on the time of day. The AT can determine which paging cycle it should operate at based on a given time of day. For example, for a daytime-user, the paging cycle could be set to 213 ms from 7 am to 11 pm and to a higher paging cycle between 11:01 pm and 6:59 am. The algorithm could further be extended to include other considerations. For example, the carrier can determine what the time intervals should be when the AT registers with an application server (e.g., QChat Server). The server could apply a different setting based on the "profile" of the user, i.e., daytime, nighttime or something in between the two. The server could determine this based on the call history of the user or let the user manually indicate his preference.

In another algorithm (an adaptive algorithm), the AT can collect statistics of past calls and generates a call arrival distribution vs. time (e.g. within a day). After a sufficient number of samples have been collected, the AT can then use this probability distribution function (e.g., call arrival vs.

time) to determine when to set the reduced paging cycle. For example, the AT can sort the probabilities of call arrivals from high to low and set the paging cycle to 213 ms for those time intervals that map to the top 95% of the calls. Additional corrections can be added adaptively based on how close the algorithm meets the constraint. These corrections would refine the duration for which the AT remains awake at a 213 ms paging cycle by taking into account variability in the call arrival pattern with respect to the predicted distribution. The more correlated the arrival of calls with respect to time, the better the performance of the algorithm. Limits (e.g., based on empirical data/calculations) can also be set to prevent the algorithm from using estimations that can lead to significant inaccuracies. For example, the total time for the reduced paging cycle could have a preset limit, so that the algorithm could not establish the reduced paging cycle for greater than that time window, which could prevent excessive battery drain even if the algorithm's estimation was inaccurate.

Those skilled in the art will appreciate that the aforementioned algorithms can be used in combination. For example, the time of day algorithm can be used initially as a bootstrap mechanism. If the system performance is acceptable using the time of day algorithm, then the access terminal can just continue to use this algorithm. However, if the performance is not acceptable, then the access terminal can switch to the adaptive algorithm. An advantage of using the time of day algorithm as a bootstrap mechanism before using the adaptive algorithm is that it enables power saving benefits right from the start, without the delay to acquire AT specific statistics. Further, the time of day algorithm may be based on a large number of samples, since the Server can monitor statistics of all daytime users rather than a single user alone. In addition, it is possible to use inputs from the Server for a large number of users as well as the AT's own call arrival pattern in determining the optimal paging cycle.

Another embodiment may take into consideration whether the AT is in battery mode using its own power or plugged into and using an external power source. In the case where the AT is plugged into an external electrical source, performance could be stepped up regardless of the time of day or any other type of algorithm in use. Another embodiment might take into consideration that applications such as group calls tend to cluster activity during PTT activity. Therefore the AT may ignore the algorithm it is using at that moment when a PTT activity starts and improve its performance responsiveness. For example, it may be the middle of the night when the AT's algorithm indicates a prolonged period of inactivity. However, after a PTT call is received in the middle of the night, the AT might stay awake with a new algorithm based on the received call, even though it is the middle of the night. If no further calls are received within a limited time, the AT may revert back to the middle of the night algorithm, based on timers or other environmental logic.

Additionally, a check may be made to determine if the application (client) is registered/activated with a system (server) and would benefit from performing the paging cycle optimizations disclosed herein. For example, push-to-talk (PTT) software may be preloaded on the access terminal and operating in memory but not activated/enabled (e.g., a subscriber has not paid to access the service). Alternatively, a PTT client although activated may not be registered with the system/server (e.g., the transmitter disabled in the access terminal). Either the unregistered or not enabled/activated application condition can be considered to place the access terminal in a deregistered state. The deregistered state may be used to inhibit any adjustments to the sleep/paging cycle by the application. Accordingly, the access terminal may use its default sleep/paging cycle, as a reduced paging cycle may only increase battery drain while not providing a benefit to the deregistered application.

In yet another embodiment, the AT may determine that it has traveled to a different time zone and accordingly adjust its algorithm to match the current time zone. Should the user of the AT decide that the algorithm should not be adjusted based on these types of time zone changes, then an override would be provided to the user through an interface. Another embodiment may make use of other applications on the AT to enable different variations of the algorithm in conjunction with the application. For instance, a calendar application may have set alerts for conference calls that are scheduled. Shortly before the calls are to be started, the alert may be used in conjunction with an algorithm to place the AT in a better system performance mode.

Figure 5:
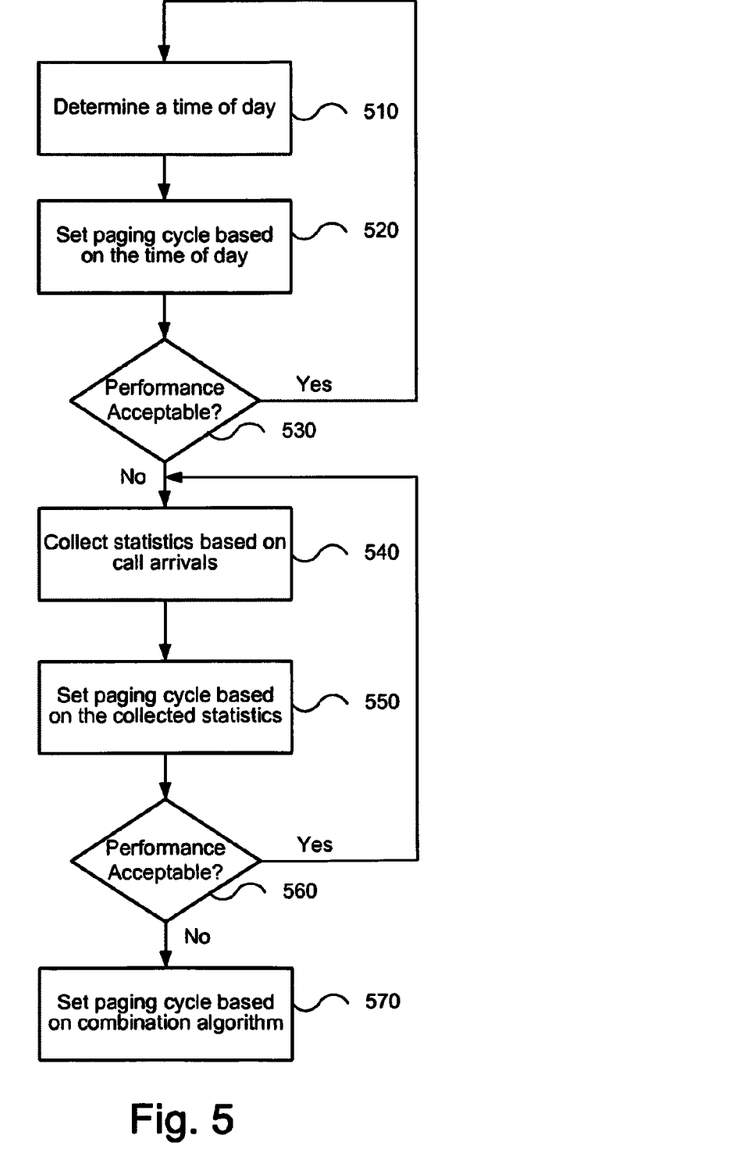
FIG. 5 is an illustration of a method in accordance with at least one embodiment of the invention.

In view of the foregoing disclosure, those skilled in the art will recognize that embodiments of the invention include methods of performing the sequence of actions, operations and/or functions previously discussed. Referring to FIG. 5, a flowchart illustrating at least one method according to embodiments of the invention is provided. For example, the process may start by determining the time of day, 510 and then based on the time of day, set a desired paging cycle, 520, (e.g., using the procedures discussed in relation to FIG. 4). Also, as discussed above the determination as to the relevant time of day settings may be established by a remote server or any of the other methods discussed herein. The process may monitor the performance of a particular application (e.g., the number of calls that achieve certain setup time metrics). If the application performance is acceptable, 530, the existing algorithm can be maintained. However, if the application is not performing acceptably, then another algorithm can be initiated. For example, the access terminal can use collected local call statistical data to adjust the paging cycle, 540. This data may be collected and processed locally at the access terminal or it can be provided to the access terminal from the RAN or other remote server. For example, the probability density function of call arrival times can be determined and used as a basis to establish when to request a reduced paging cycle based on the call arrival data collected. If the application performance is acceptable, 550, this algorithm can be maintained. However, if the application is not performing acceptably, then yet another algorithm can be initiated. For example, the AT can use a combination algorithm 560 that sets the paging cycle based on the statistics from the server and AT specific collected statistics to achieve acceptable performance.

However, those skilled in the art will appreciate that embodiments of the invention are not limited to these examples. For example, embodiments of the invention include determining an optimal paging cycle and setting the paging cycle based on the optimal paging cycle, wherein the paging cycle varies over time based on at least one optimizing metric. Additional constraints can also be included (e.g., the remaining battery charge) that can further modify and/or override the algorithms and further enhance the optimization, as discussed in the foregoing.

As noted above, embodiments of the invention can reduce the delays in delay sensitive applications. A group communication system is an example of a delay sensitive system that can take advantage of reduced connection times offered by the hybrid communication setup disclosed herein. The group communication system may also be known as a push-to-talk (PTT) system, a QChat system, a net broadcast service (NBS), a dispatch system, or a point-to-multi-point communication system. Typically, a group of access terminal users can communicate with one another using an access terminal assigned to each group member. The term "group member" denotes a group of access terminal users authorized to communicate with each other. Although, group communication systems/PTT systems may be considered to be among several members, the system is not limited to this configuration and can apply to communication between individual devices on a one to one basis.

The group may operate over an existing communications system, without requiring substantial changes to the existing infrastructure. Thus, a controller and users may operate in any system capable of transmitting and receiving packet information using Internet protocol (IP), such as a Code Division Multiple Access (CDMA) system, a Time Division Multiple Access (TDMA) system, a Global System for Mobile Communications (GSM) system, satellite communication systems, combinations of land line and wireless systems, and the like.

Group members may communicate with each other using an assigned access terminal, such as ATs 102, and 108. The ATs may be wireline or wireless devices such as terrestrial wireless telephones, wireline telephones having push-to-talk capability, satellite telephones equipped with push-to-talk functionality, laptop or desktop computers, paging devices, or any combination thereof. Furthermore, each AT may be able to send and receive information in either a secure mode, or a non-secure (clear) mode. It should be understood that reference to an access terminal (AT) is not intended to be limited to the illustrated or enumerated examples, and may encompass other devices that have the capability to transmit and receive packet information in accordance with the Internet Protocol (IP).

When a group member wishes to transmit information to other members of the group, the member may request the transmission privilege by pressing a push-to-talk button or key (e.g., 228 in FIG. 2) on an AT, which generates a request formatted for transmission over a distributed network. For example AT 102, the request may be transmitted over the air to one or more MPTs (or base stations) 124. A MPC/MSC 122, which may include a well-known inter-working function (IWF), packet data serving node (PDSN), or packet control function (PCF), for processing data packets may exist between MPT/BS 124 and the distributed network. However, the requests may also be transmitted through the public switched telephone network (PSTN) to a carrier network 126. The carrier network 126 may receive the request and provide it to RAN 120.

Figure 6:
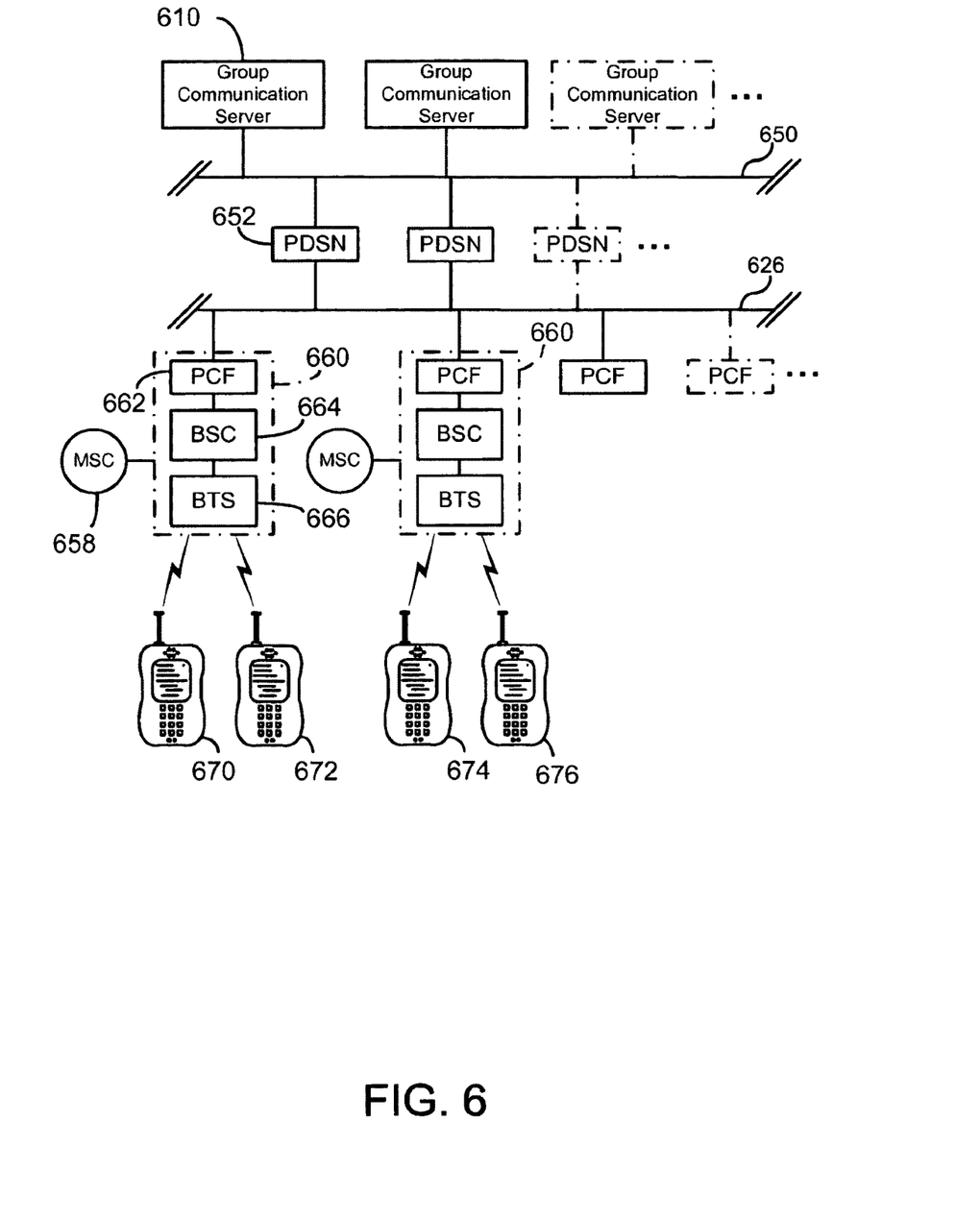
FIG. 6 is an illustration a group communication system in accordance with at least one embodiment of the invention.

Referring to FIG. 6, one or more group communication (e.g., QChat) servers 610, can monitor traffic of the group communication system through its connection to a distributed network. Since group communication server 610 can be connected to the distributed network through a variety of wired and wireless interfaces, geographic proximity to group participants is not necessary. Typically, a group communication server 610 controls communications between the wireless devices of set group members (ATs 670, 672, 674, 676) in a PTT system. The wireless network illustrated is merely exemplary and can include any system whereby remote modules communicate over-the-air between and among each other and/or between and among components of a wireless network including, without limitation, wireless network carriers and/or servers. A series of group communication servers 610 can be connected to a group communication server LAN 650 and work cooperatively to provide group communication services.

The group communication server(s) 610 can be connected to a wireless service provider's packet data service node (PDSN) such as PSDN 652, shown here resident on a carrier network 626. Each PSDN 652 can interface with a base station controller 664 of a base station 660 through a packet control function (PCF) 662. The PCF 662 may be located in the base station 660. The carrier network 626 controls messages (generally in the form of data packets) sent to a MSC 658. The MSC 658 can be connected to one or more base stations 660. In a similar manner to the carrier network, the MSC 658 is typically connected to the BTS 666 by both the network and/or Internet for data transfer and PSTN for voice information. The BTS 666 ultimately broadcasts and receives messages wirelessly to and from the wireless ATs, such as cellular telephones 670, 672, 674, 676, as is well known in the art. Accordingly, the details of the group communication system will not be further discussed.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Accordingly, an embodiment of the invention can include a computer readable media embodying methods discussed herein. For example, an embodiment can include a computer readable media embodying a method for optimizing paging cycles. The method can include determining an optimal paging cycle; and setting a paging cycle of an access terminal based on the optimal paging cycle, wherein the optimal paging cycle varies over time based on at least one optimizing metric. Accordingly, the invention is not limited to the examples provided herein and any means for performing the functions, processes, sequence of actions and/or algorithms described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method comprising:
    determining an optimal paging cycle;
    setting a paging cycle of an access terminal based on the optimal paging cycle, wherein the optimal paging cycle varies over time based on at least one optimizing metric;
    evaluating performance of an application being executed by the access terminal during the paging cycle based on collected statistics; and
    adjusting the optimal paging cycle, when the performance of the application falls below a threshold.

2. The method of claim 1, wherein the at least one optimizing metric is at least one of a time of day, call arrival statistics, user profile, type of communication received, or available energy reserve.

3. The method of claim 1, wherein determining the optimal paging cycle comprises:
    determining a time of day; and
    setting the optimal paging cycle based on the time of day.

4. The method of claim 1, wherein the performance is evaluated based on call arrival statistics.

5. The method of claim 4, wherein the threshold is that 95 percent of mobile-terminated calls arrive when the access terminal is operating at a 213 ms paging cycle.

6. The method of claim 1, wherein determining the optimal paging cycle comprises:
    collecting call arrival statistics; and
    setting the optimal paging cycle based on the call arrival statistics.

7. The method of claim 6, wherein the call arrival statistics are determined at the access terminal.

8. The method of claim 1, further comprising:
    setting the optimal paging cycle to an increased duration, if an available energy reserve falls below a threshold value.

9. The method of claim 1, wherein determining the optimal paging cycle comprises:
    registering the access terminal at an application server; and
    setting the optimal paging cycle based on a user profile stored for the access terminal.

10. The method of claim 1, wherein setting the paging cycle of the access terminal comprises:
    generating a paging cycle request in the application to update the paging cycle;
    processing the paging cycle request in an application programming interface for adjusting the paging cycle;
    transmitting the paging cycle request to an access network in communication with the access terminal;
    receiving a request acceptance from the access network; and
    forwarding the request acceptance to the application.

11. The method of claim 1, wherein determining the optimal paging cycle comprises:
    setting a reduced paging cycle based on a scheduled event.

12. The method of claim 11, wherein the reduced paging cycle is automatically set before the scheduled event based on information saved on the access terminal.

13. The method of claim 1, wherein determining the optimal paging cycle comprises:
    setting a reduced paging cycle based on a type of communication received.

14. The method of claim 13, wherein the type of communication received is a push-to-talk call.

15. The method of claim 1, wherein the performance is evaluated based on call arrival statistics, and wherein the threshold comprises a fixed percent of mobile-terminated call arrivals occurring during the optimal paging cycle.

16. The method of claim 1, wherein evaluating the performance further comprises applying a penalty function for a call drop.

17. The method of claim 1, further comprising:
    making or receiving a call;
    changing the optimal paging cycle to a different paging cycle in response to the making or the receiving of the call;
    determining expiration of a time period within which a subsequent call has not been made or received during use of the different paging cycle; and
    reverting back to the optimal paging cycle based on the expiration of the time period.

18. The method of claim 1, wherein the at least one optimizing metric comprises a call setup latency.

19. The method of claim 18, wherein the threshold is that 95 percent of mobile-terminated calls arrive when the access terminal is operating at a 213 ms paging cycle.

20. The method of claim 1, wherein the at least one optimizing metric comprises at least one of a customer profile.

21. The method of claim 20, wherein the customer profile comprises at least one of a business profile, an emergency profile or consumer profile.

22. The method of claim 21, wherein call set up latency guarantees are determined based on the customer profile.

23. The method of claim 21, wherein the business profile or the emergency profile is given a lower call set up latency guarantee than the consumer profile.

24. An apparatus comprising:
logic configured to determine an optimal paging cycle;
logic configured to set a paging cycle on an access terminal based on the optimal paging cycle, wherein the optimal paging cycle varies over time based on at least one optimizing metric;
logic configured to evaluate performance of an application being executed by the access terminal during the paging cycle based on collected statistics; and
logic configured to adjust the optimal paging cycle, when the performance of the application falls below a threshold.

25. The apparatus of claim 24, wherein the at least one optimizing metric is at least one of a time of day, call arrival statistics, user profile, type of communication received, or available energy reserve.

26. The apparatus of claim 24, which further comprises:
logic configured to determine a time of day; and
logic configured to set the optimal paging cycle based on the time of day.

27. The apparatus of claim 24, wherein the logic configured to adjust the optimal paging cycle adjusts based on call arrival statistics.

28. The apparatus of claim 27, wherein the call arrival statistics are determined at the access terminal.

29. The apparatus of claim 24, further comprising:
logic configured to set the optimal paging cycle to an increased duration, if an available energy reserve falls below a threshold value.

30. The apparatus of claim 24, wherein the logic configured to determine the optimal paging cycle comprises:
logic configured to register the access terminal at an application server; and
logic configured to set the optimal paging cycle based on a user profile stored for the access terminal.

31. The apparatus of claim 24, wherein the logic configured to set the paging cycle of the access terminal comprises:
the application which is configured to generate a paging cycle request to update the paging cycle;
an application programming interface (API) configured to process the paging cycle request;
logic configured to transmit the paging cycle request to an access network in communication with the access terminal;
logic configured to receive a request acceptance from the access network; and
logic configured to forwarding the request acceptance the application that generated the paging cycle request.

32. The apparatus of claim 24, further comprising:
logic configured to set a reduced paging cycle based on a type of communication received.

33. The apparatus of claim 32, wherein the type of communication received is a push-to-talk call.

34. The apparatus of claim 24, wherein the performance is evaluated based on call arrival statistics, and wherein the threshold comprises a fixed percent of mobile-terminated call arrivals occurring during the optimal paging cycle.

35. The apparatus of claim 24, wherein the logic configured to evaluate the performance further comprises logic configured to apply a penalty function for a call drop.

36. The apparatus of claim 24, further comprising:
logic configured to make or receive a call;
logic configured to change the optimal paging cycle to a different paging cycle in response to the making or the receiving of the call;
logic configured to determine expiration of a time period within which a subsequent call has not been made or received during use of the different paging cycle; and
logic configured to revert back to the optimal paging cycle based on the expiration of the time period.

37. An access terminal comprising:
means for determining an optimal paging cycle;
means for setting a paging cycle of the access terminal based on the optimal paging cycle, wherein the paging cycle varies over time based on at least one optimizing metric;
means for evaluating performance of an application being executed by the access terminal during the paging cycle based on collected statistics; and
means for adjusting the optimal paging cycle, when the performance of the application falls below a threshold.

38. The access terminal of claim 37, wherein the at least one optimizing metric is at least one of a time of day, call arrival statistics, user profile, type of communication received, or available energy reserve.

39. The access terminal of claim 37, wherein the means for setting the paging cycle of the access terminal comprises:
means for generating a paging cycle request in the application to update the paging cycle;
means for processing the paging cycle request for adjusting the paging cycle;
means for transmitting the paging cycle request to an access network in communication with the access terminal;
means for receiving a request acceptance from the access network; and
means for forwarding the request acceptance to the application.

40. The access terminal of claim 37, wherein the means for determining the optimal paging cycle comprises:
means for collecting call arrival statistics based on detected call arrivals at the access terminal; and
means for setting the optimal paging cycle based on the call arrival statistics.

41. A non-transitory computer-readable medium embodying a set of instructions, wherein the set of instructions when executed by one or more processors comprises:
a set of instructions to determine an optimal paging cycle;
a set of instructions to set a paging cycle of an access terminal based on the optimal paging cycle, wherein the optimal paging cycle varies over time based on at least one optimizing metric;
a set of instructions to evaluate performance of an application being executed by the access terminal during the paging cycle based on collected statistics; and
a set of instructions to adjust the optimal paging cycle, when the performance of the application falls below a threshold.

42. The non-transitory computer-readable medium of claim 41, further comprising:
a set of instructions to determine a time of day; and
a set of instructions to set the optimal paging cycle based on the time of day.

43. The non-transitory computer-readable medium of claim 41, further comprising:
a set of instructions to collect call arrival statistics based on detected call arrivals at the access terminal; and a set of instructions to set the optimal paging cycle based on the call arrival statistics.

44. The non-transitory computer-readable medium of claim 41, further comprising:
a set of instructions to set a reduced paging cycle based on a type of communication received.

45. The non-transitory computer-readable medium of claim 44, wherein the type of communication received is a push-to-talk call.

* * * * *